Feb. 25, 1958 C. P. McCLELLAND 2,824,456
FLEXIBLE CABLE DRIVE FOR OSCILLATING SHAFTS
Filed May 8, 1953 2 Sheets-Sheet 1
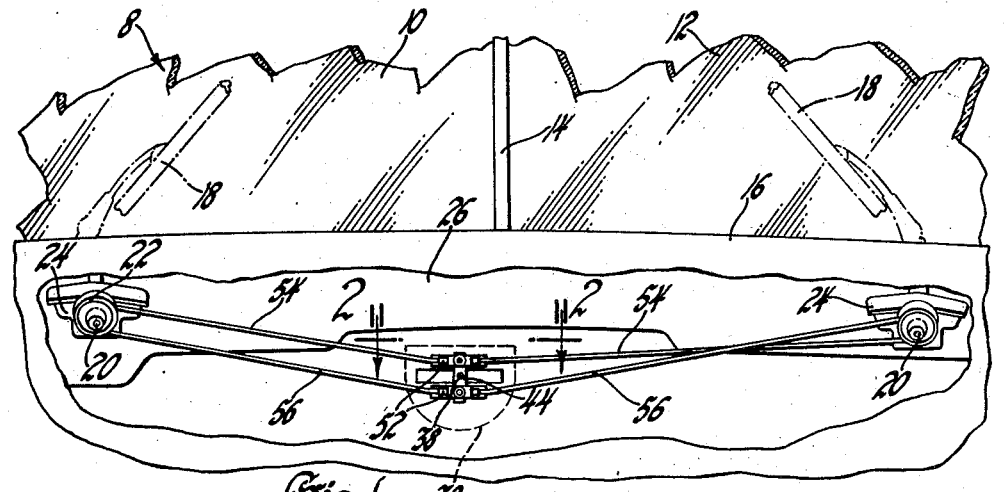
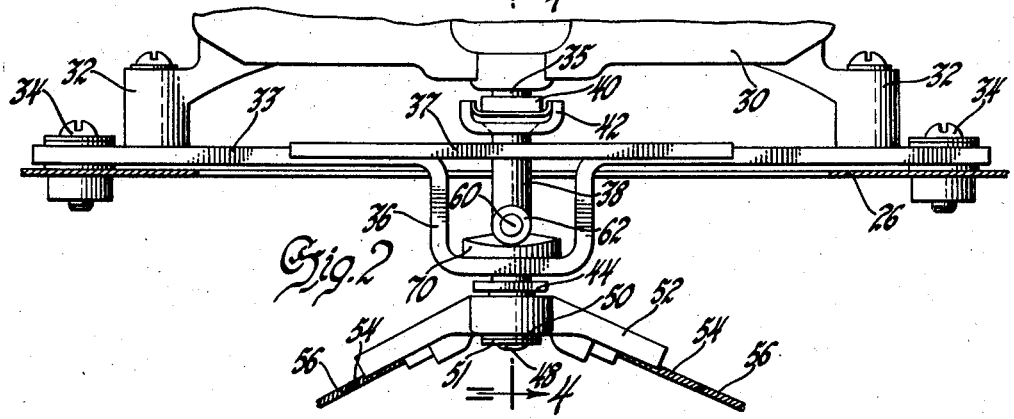
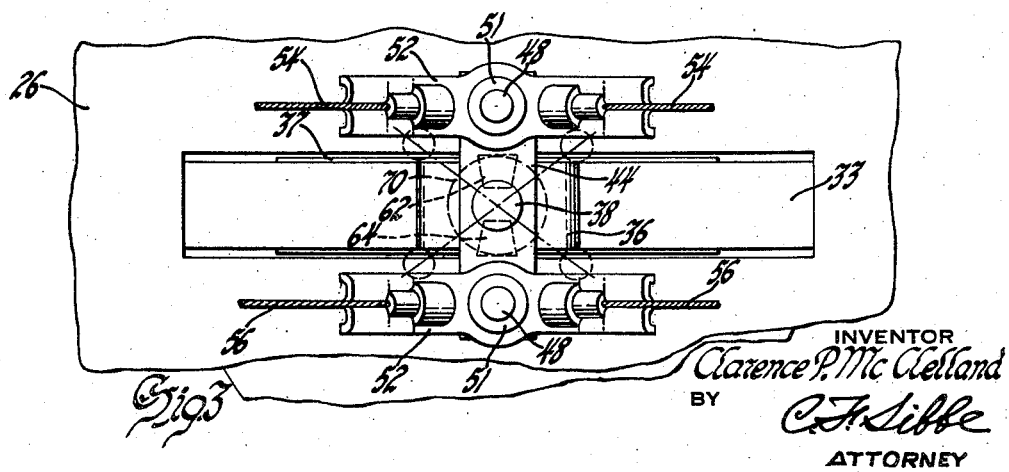
INVENTOR
Clarence P. McClelland
BY
C. H. Sibble
ATTORNEY Feb. 25, 1958 C. P. McCLELLAND 2,824,456
FLEXIBLE CABLE DRIVE FOR OSCILLATING SHAFTS
Filed May 8, 1953 2 Sheets-Sheet 2
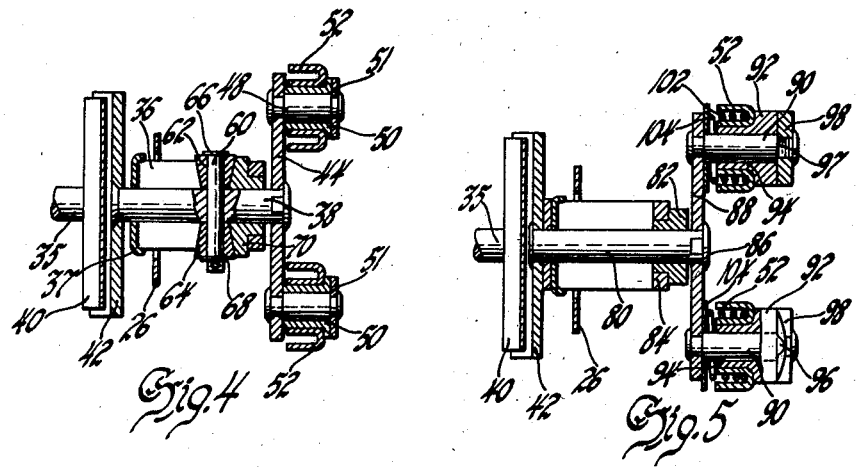
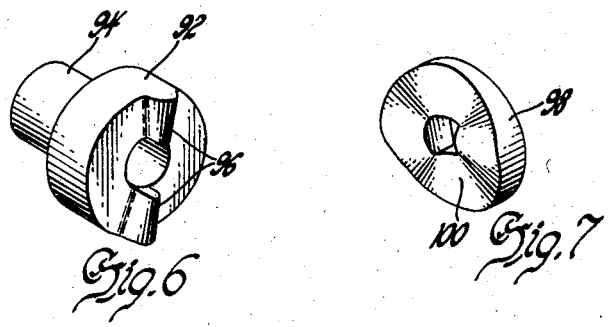
INVENTOR
Clarence P. McClelland
BY
ATTORNEY United States Patent Office 2,824,456
Patented Feb. 25, 1958

2,824,456

FLEXIBLE CABLE DRIVE FOR OSCILLATING SHAFTS

Clarence P. McClelland, Royal Oak, Mich., assignor to General Motors Corporation, Detroit, Mich., a corporation of Delaware Application May 8, 1953, Serial No. 353,726

20 Claims. (Cl. 74—96)

This invention relates to a flexible cable apparatus for transmitting an oscillatory movement from one shaft to other shafts and more specifically to a flexible cable apparatus connected to a driver shaft for oscillating other shafts spaced from the driver shaft such as dual windshield wiper shafts driven by a single motor.

In modern automobiles, it is often the practice to mount the windshield wiper motor on the engine compartment side of the dash or fire wall thereof. This renders the wiper motor easily accessible and provides more room on the passenger side for other mechanisms, such as a radio, heater, speedometer and miscellaneous conduits and other connections in the limited space between the dash and the instrument panel. Cables are usually used to connect an oscillatable driver shaft to shafts spaced from the driver shaft for operating dual wipers. A difficulty arises in such a situation, however, in that the driver shaft terminates at a point forward of and usually below the wiper shafts and consequently the cables are deflected to a changing degree by driving instrumentalities during each cycle of wiper operation. Varying deflection of the cables results in varying tensions therein as is the case when an archer pulls upon the string of his bow. Other factors enter in but the one which often contributes to the difficulties encountered is that the shafts referred to are not mounted in parallelism but at an angle or at angles with respect to each other. The varying tension in the cables is such that in some cases undue wear and erratic performance of the windshield wiper drive have resulted.

Provisions have been made in the past for spring loading of the cables, whereby undue cable tension is avoided, but despite such precautionary measures, performance of the wipers is not as stable and uniform during a complete cycle of wiper motion as would be desirable and often is quite erratic. A variation in the cable tension during each cycle of wiper motion is not fully compensated for or sufficiently eliminated by the yielding of spring means but is merely slightly reduced in magnitude thereby. A variation in the spring length obviously demonstrates that the cable tension is not uniform. An improved cable tensioning apparatus is disclosed in my co-pending application, Serial Number 196,268, filed November 17, 1950, and which issued on December 1, 1953, as Patent No. 2,660,894.

An object of the present invention is to provide a flexible cable transmission apparatus in which means are employed for stabilizing or for controlling the tension in the cable. Another object is to provide a transmission apparatus in which a driver shaft and at least one driven shaft are connected by cable means placed under uniform tension during each cycle of operation despite angular or offset disposition of the shafts with relation to each other. A further object is to provide a cable transmission apparatus in which the cable tension is controlled and which permits mounting of the driver shaft in one plane, such as adjacent the fire wall or dash of an automobile vehicle, and the two driven shafts, which may be dual windshield wiper shafts, in another plane or other planes and further to the rear of the dash in accordance with the customary location of a windshield with respect to the cowl and dash.

A feature of the invention comprises means for moving the cables or portions of the cables laterally or in a direction parallel with the driver shaft and in synchronism with the oscillation of the latter. Another and preferred feature comprises cam means for shifting the cables by moving the driver shaft longitudinally and in synchronism with oscillation of the latter. Still another feature comprises cam means for moving the cables with respect to the driver shaft to control or stabilize the tension in the cables.

The above and other features of the invention will now be more particularly described by reference to the accompanying drawings and pointed out in the claims.

In the drawings:

Figure 1 is a fragmentary elevational view of a portion of the dash and windshield wiper of an automobile as viewed from the interior of the latter, parts being broken away to show the improved windshield wiper drive apparatus;

Figure 2 is an enlarged fragmentary section taken along the line 2—2 of Figure 1;

Figure 3 is an enlarged elevational view of a portion of the drive apparatus as shown in Figures 1 and 2;

Figure 4 is a sectional view taken along the line 4—4 of Figure 2;

Figure 5 is a view similar to that of Figure 4 showing a modified structure;

Figure 6 is a perspective view of a cam member shown in Figure 5 and drawn to an enlarged scale; and Figure 7 is a perspective view of another cam element shown in Figure 5 drawn to the same scale as is Figure 6.

Referring to the drawings which illustrate an embodiment of the invention as installed in a motor vehicle, a two-part windshield 8 is disclosed, including glass panels 10 and 12, separated by a center frame member 14. The windshield is positioned above an instrument panel 16, part of which is broken away in Figure 1 better to illustrate the windshield wiper drive apparatus. Each panel of the windshield is provided with a wiper 18 as is conventional and as the mechanisms for operating the wipers are similar, duplicate parts are designated in the drawings by the same reference characters.

Each wiper 18 is arranged to be driven from a shaft 20 and the latter is adapted to be driven by a pulley arrangement 22 and is journaled in a bearing support 24 attached to the dash or fire-wall 26 by bolts not shown in a conventional manner. The pulley arrangement 22 may be of the type disclosed in the Patent No. 2,660,894 heretofore referred to.

A windshield wiper motor 30, which may be of the conventional oscillating type, is mounted on the engine side of the dash or fire wall 26 by means of foot members 32 which are attached to a plate 33 which in turn is bolted to the wall 26 by means of bolts 34. A driver shaft 35 extends rearwardly from the wiper motor 30 in axial alignment with a stub shaft 38. The plate 33 has a bearing support 36 integral therewith and a center aperture aligned with the motor shaft 35 and the bearing support 36 as well as the bearing plate 37 are provided in which a stub shaft 38 is journaled. The motor shaft 35 has at its rear end a block 40 forming one part of a universal connection, the other part of that connection comprising a U-shaped member 42 mounted on the forward end of stub shaft 38 with its arms disposed adjacent the opposite sides of the block 40 to provide a simple universal type drive. A rocker arm 44 is rigidly affixed to the rearwardly disposed end of shaft 38. A pin 48 is secured by rivet means at each end of the arm 44. A bushing 50 is provided on each of the pins 48 and is preferably formed of porous metal impregnated with oil for lubricating purposes. The bushings 50 are retained in place with the aid of washers 51 and each provides a pivotal mounting for a V-shaped cable holder element 52.

As shown in Figure 1, flexible cables 54 and 56 extend from the cable holder elements 52 on each side of the motor driven arm 44 and are connected rotatively to drive a pulley arrangement 22 on each side as heretofore referred to. As in the Patent No. 2,660,894, two cables 54 and 56 are employed for each pulley arrangement 22 but, insofar as the present invention is concerned, one cable may be employed in their place. The cable runs on one side are crossed to provide simultaneous inward and outward operation of the two wipers. Because of the usual configuration of a windshield, the flexible cable and pulley means extend in a plane not normal to the driver shaft 38—i. e.—the windshield wiper shafts are spaced horizontally or to the sides from the driver shaft and above the driver shaft and also rearwardly of the driver shaft.

With reference to Figures 2, 3, and 4, the shaft 38 is provided with a cross pin 60 which bears two cam rollers 62 and 64. The shaft 60 is retained in position by a suitable head 66 (Figure 4) on one end thereof, and by a washer 68 at the other end which may be held against outward axial movement by a cotter pin.

The support 36 has secured thereto a cam member 70 which is adapted to engage the conical rollers 62 and 64. The configuration of the cam member 70 is such that the rollers 62 and 64 are caused to move to the left or forwardly, as viewed in Figure 4, and to the greatest extent at the extremes of the oscillatory motion of the arm 44 or the wipers 18. These extremes are shown by broken lines in Figure 3. When the arm 44 is positioned as shown in Figures 1, 2, and 3 (mid-position), the shaft 38 is cammed to its extreme right position (rearwardly) as viewed in Figure 4.

From the above description it will be seen that, in the operation of the wiper motor, tension in the opposed cables 54 and also in the opposed cables 56 tends to keep the rollers 62 and 64 in contact with the cam member 70 (because of the angularity of the cables with respect to the shaft 38) and therefore the driver shaft 38 tends to reciprocate longitudinally during operation and this longitudinal reciprocation is synchronized with the rotational or oscillatory movement of the shaft 38 so that tension in the cables is stabilized or controlled. Without longitudinal reciprocation of the shaft 38 or lateral movement of the cables as brought about by the present invention and from actual experience it has been found that tension in the cables would be greatest at the mid stroke (when arm 44 is positioned as shown in Figure 3 for maximum deflection of the cables) and that tension would decrease as the arm 44 approaches the dash line positions of Figure 3 but the cam action of the present invention is such as to eliminate this increase and decrease and, in other words, the result is to stabilize the tension.

Figures 5, 6, and 7 depict a modification with regard to the means for moving the cables to secure the same end results, i. e. stabilization or control of the cable tension. In Figure 5, a driver shaft 80 is provided which is not adapted to be reciprocated longitudinally but is rotatably to be driven by a universal connection as in the case of shaft 38. The shaft 80 is journaled at its rearward end in a bushing 82 which is supported on the frame member 84 and is upset at 86 to hold an arm 88 in fixed relation with respect to the shaft 80. A pin 90 is rigidly fixed to each end of the arm 88. Journaled on each pin 90 is a cam member 92 having a reduced portion 94 and two radial cam ridges 96. Maintained on the square end 97 of each pin 90 and therefore nonrotatively held with relation to the arm 88 is a cam member 98 of a configuration such as shown in Figure 7. The cam member 98 has two valleys and two ridges as shown on its face 100 and these are adapted to cooperate with the radial ridges 96 of the cam member 92. Surrounding each reduced portion 94 and journaled thereon is a V-shaped cable holder element 52 similar to the holder elements employed in the modification of Figures 2, 3, and 4, but with respect to Figure 5 a coil spring 102 is seated within each holder element 52 with one end thereof arranged to press against a washer 104 interposed between it and the arm 88. The cam member 92 is wedged tightly into engagement with the holder element 52 and is therefore in nonrotative relation therewith.

As used herein, the term "cable holder means" is used to indicate the assembly of parts attached to the end of the shaft 80 for bringing about a lateral motion of the cables with respect to that shaft during rotation or oscillation of the latter.

In the operation of the modification of Figure 5, oscillation of the shaft 80 and arm 88 causes an oscillation of each cam member 92 with respect to its corresponding cam member 98 and the action of the cam members, due to their cam surface contours, is such that cables attached to the V-shaped holder elements 52 are moved in a direction parallel with the shaft 80 in synchronism with oscillation of the latter and in such a way as to stabilize or control the cable tension.

The invention is not to be understood as limited to the details described, since these may be modified within the scope of the appended claims without departing from the spirit of the invention which applies to shifting of the cables laterally or in a direction parallel with the shaft 38 to secure the result desired. In effect, means are employed to "cam" or move the cables laterally to minimize variations in cable tension which have heretofore been encountered.

Having described my invention what I claim as new and desire to secure by Letters Patent of the United States is:

I claim:

1. A flexible cable transmission apparatus for effecting oscillatory movement of windshield wipers and the like comprising an oscillatable driver shaft, a member mounted transversely of and in fixed relation on said shaft, opposed flexible cables attached at each of two points on said member at opposite sides of said shaft, and cam means arranged to impart motion to said cables in a direction parallel with said driver shaft.

2. A windshield wiper drive apparatus comprising an oscillatory driver shaft, a member mounted transverse to and in fixed relation on said shaft, a support for said shaft, opposed flexible cables attached at each of two points on said member, said points being located at opposite sides of said shaft, and cam means associated with said shaft and support and arranged to impart reciprocatory motion to said cables in synchronism with the oscillatory motion of said driver shaft.

3. A flexible cable transmission apparatus for effecting oscillatory motion of windshield wipers and the like comprising an oscillating driver shaft, a support for said shaft, a member mounted transversely of and in fixed relation on said shaft, opposed flexible cables attached at each of two points on said member, said points being located at opposite sides of said shaft, said cables being in tension and in planes not normal to but at an angle with said driver shaft, and cam means associated with said shaft and support and arranged to impart motion to said cables in a direction parallel with said driver shaft to control tension in said cables.

4. A flexible cable transmission apparatus for effecting oscillatory movement of windshield wipers and the like comprising an oscillatable driver shaft, a support for said shaft, a member transversely of and in fixed relation on said shaft, opposed flexible cables extending at an angle to each other and attached at spaced points on said member, said points being located at opposite sides of said shaft, and cam means associated with said shaft and support and arranged to impart motion to said cables in a direction parallel with said driver shaft to stabilize tension in said cables.

5. A flexible cable transmission apparatus for effecting oscillatory movement of windshield wipers and the like comprising an oscillatable driver shaft, a member mounted transversely of and in fixed relation on said shaft, opposed flexible cables attached at each of two points on said member, said points being located at opposite sides of said shaft, a roller pivoted to said driver shaft with its axis at an angle to said shaft, and a cam mounted in engagement with said roller for imparting motion to said driver shaft, member and cables in a direction parallel with said driver shaft and in synchronism with the oscillatory movement of said member.

6. A windshield wiper drive apparatus comprising an oscillatable driver shaft, a member mounted transverse to and in fixed relation on said shaft, a V-shaped cable holder element pivoted at each of two points on said member, opposed cables attached to each of said elements, said holder elements being located at opposite sides of said shaft, and cam means associated with said shaft and arranged to impart motion to said shaft, elements and cables in a direction parallel with said driver shaft and in synchronism with the oscillatory motion of said driver shaft.

7. A flexible cable transmission apparatus for effecting oscillatory movement of windshield wipers and the like comprising an oscillatory driver shaft, a member mounted transverse to and in fixed relation on said shaft, opposed flexible cables attached to elements pivoted at spaced points on said member, said elements being located at opposite sides of such shaft, and cam means arranged at said pivot points to impart motion to said cables in a direction parallel with said driver shaft and in synchronism with the oscillatory motion of the latter.

8. A windshield wiper drive apparatus comprising an oscillatory driver shaft, a member mounted transverse to and in fixed relation on said shaft, two opposed flexible cables pivotly connected at each of two points to said member, said points being located at opposite sides of said shaft, cam means arranged between said cables and said member to impart motion to said cables in a direction parallel with said driver shaft, and spring means between said member and said cam means to render the latter effective.

9. A windshield wiper drive apparatus comprising an oscillatory driver shaft, a member fixed to the end of said shaft, two opposed flexible cables pivotally attached at spaced pivotal points on said member, said points being located at opposite sides of such shaft, and annular cam means located at each pivot point to impart motion to said cables in a direction parallel with said driver shaft for controlling tension in said cables as said driver shaft oscillates.

10. A flexible cable transmission apparatus for effecting an oscillatory movement of windshield wipers and the like comprising an oscillatory driver shaft, a member mounted transversely of and in fixed relation to the end of said shaft, opposed flexible cables attached at each of two points on said member, said cables being arranged to act in tension in planes not normal to said driver shaft, cam means arranged to impart motion to said cables in a direction parallel with said driver shaft and in synchronism with oscillation of the latter, and spring means arranged to render said cam means effective.

11. A flexible cable transmission apparatus for effecting an oscillatory movement of windshield wipers and the like comprising an oscillatory driver shaft, a member mounted transversely of and in fixed relation to the end of said shaft to oscillate therewith, a V-shaped cable holder element pivoted to each end portion of said transverse member, said elements being located at opposite sides of said driver shaft, two opposed cables attached to each of said elements, and cam means arranged to be operated by said driver shaft to impart motion to said elements and cables for stabilizing tension in said opposed cables during a complete cycle of oscillation of said driver shaft.

12. A flexible cable transmission apparatus for effecting oscillatory movement of windshield wipers and the like comprising an oscillatory driver shaft, rollers pivoted to said shaft with their axes perpendicular thereto, a fixed cam member in engagement with said rollers, an arm member mounted transversely of and in fixed relation to the end of said shaft to oscillate therewith, a V-shaped cable holder element pivoted to each end portion of said arm member, said elements being located at opposite sides of said driver shaft, two opposed cables attached to each of said elements, and said cam member and rollers being adapted to impart motion to said elements and cables in a direction parallel with said driver shaft for controlling tension in said opposed cables during oscillation of said driver shaft.

13. A flexible cable transmission apparatus for effecting oscillatory movement of windshield wipers and the like comprising an oscillatory driver shaft, an arm member mounted transversely of and in fixed relation to the end of said shaft to oscillate therewith, a V-shaped cable holder element pivoted to each end portion of said arm members, said elements being located at opposite sides of said driver shaft, opposed cables attached to each of said elements, and annular cam means located on said arm member adjacent each of said holder elements to impart motion to said cables in a direction to control tension in said opposed cables during oscillation of said driver shaft.

14. A windshield wiper drive apparatus comprising an oscillatory driver shaft, a member mounted transversely of and in fixed relation on said shaft, opposed flexible cables attached at each of two points on said member, said points being located at opposite sides of said shaft, cam means arranged to impart reciprocal motion to said cables in synchronism with the oscillatory motion of said driver shaft, two driven shafts supported in spaced relation with said driver shaft and said cables being attached to said driven shafts to constitute driving means therefore.

15. A flexible cable transmission apparatus for effecting oscillatory movement of spaced shafts, such as windshield wiper shafts, comprising a driver shaft mounted on a support for oscillation with respect to its own axis, an arm member fixed to said shaft in transverse relation thereto for oscillation therewith, opposed flexible cables pivoted to each end portion of said arm member, two driven shafts mounted in bearings attached to said support, said driven shafts being vertically and horizontally spaced from said driver shaft, pulleys on said driven shafts, said cables connecting said arm member to said pulleys to drive the latter, and cam means arranged to impart reciprocal motion to the portions of said cables adjacent said arm member in a direction parallel with said driver shaft to control tension in said cables during oscillation of said arm member.

16. A flexible cable transmission apparatus for effecting oscillatory motion of spaced shafts such as dual windshield wiper shafts from a single driver shaft comprising an oscillatory driver shaft, at least one driven shaft spaced from said oscillatory driver shaft and arranged to be driven by the latter through flexible cable and pulley means, cable holder means mounted on said driver shaft, pulleys on said driven shaft, cables operatively connecting said pulleys to said cable holder means and engaging the latter at opposite sides of the driver shaft for spacing the cable portions adjacent the latter, and said cable holder means being arranged to urge said cable portions in a direction parallel with said driver shaft to control tension in the cables during oscillation of the said driver and driven shafts.

17. A flexible cable transmission for effecting oscillatory motion of one driven shaft from a driver shaft comprising an oscillatable driver shaft, a driven shaft in approximate parallelism with said driver shaft, cable holder means mounted in fixed relation on said driver shaft to be oscillated thereby, pulley means fixed to said driven shaft, cable means operatively connecting said pulley means to said cable holder means and engaging the latter at points above and below said driver shaft, and said cable holder means being arranged to shift said engaging points in a direction parallel with said driver shaft during oscillation of the latter to stabilize tension in said cable means.

18. A flexible cable transmission for effecting oscillatory motion of a windshield wiper shaft comprising an oscillatory driver shaft, cable holder means mounted in fixed relation on said driver shaft to be oscillated therewith, a windshield wiper shaft in approximate parallelism with said driver shaft, pulley means fixed to said wiper shaft, flexible cable means operatively connecting said pulley means to said cable holder means to engage the latter at points above and below said driver shaft and extending in a plane not normal but an an angle to the said driver shaft, and said cable holder means having a cam surface arrangement to shift said engaging points in a direction parallel with said driver shaft during each cycle of oscillation.

19. A flexible cable transmission comprising a driver shaft, a driven shaft, flexible cable and pulley means connecting the said shafts and extending in a plane not normal but at an angle to the said driver shaft, cable holder means interposed between said driver shaft and the cable portions of said cable pulley means, and said cable holder means being arranged to move said cable portions where adjacent to said cable holder means into and away from said plane during oscillation of said driver shaft and curved surface means associated with said cable holder means to bring about such movement.

20. A flexible cable transmission comprising a driver shaft, a driven shaft vertically and horizontally spaced from said driver shaft, flexible cable and pulley means connecting the said shafts and arranged to transmit oscillatory motion from said driver shaft to said driven shaft, cable holder means interposed between said driver shaft and the cable portions of said cable and pulley means, and said cable holder means including a surface arranged to exert a cam action effective on said cable portions during each oscillatory cycle to move said portions laterally.

References Cited in the file of this patent

UNITED STATES PATENTS 2,660,894     McClelland _____ Dec. 1, 1953

FOREIGN PATENTS 195,704     Great Britain _____ Mar. 23, 1923